Feb. 26, 1924.  
W. F. SIPPLE  
CONVEYER CHAIN LINK  
Filed Nov. 16, 1922  
1,484,972  
2 Sheets-Sheet 1

Witnesses  
George A. Gruss  
Evelyn Crompton

Inventor  
William F. Sipple  
By Joshua R. H. Potts  
His Attorney

Feb. 26, 1924.

W. F. SIPPLE 1,484,972

CONVEYER CHAIN LINK

Filed Nov. 16, 1922

2 Sheets-Sheet 2

Witnesses
George A. Gunes
Evelyn Crompton

Inventor
William F. Sipple
By Joshua R H Potts
His Attorney

Patented Feb. 26, 1924.

1,484,972

UNITED STATES PATENT OFFICE.

WILLIAM F. SIPPLE, OF HAZLETON, PENNSYLVANIA.

CONVEYER-CHAIN LINK.

Application filed November 16, 1922. Serial No. 601,226.

*To all whom it may concern:*

Be it known that I, WILLIAM F. SIPPLE, a citizen of the United States, residing at Hazleton, in the county of Luzerne and State of Pennsylvania, have invented certain new and useful Improvements in Conveyer-Chain Links, of which the following is a specification.

My invention relates to conveyer chain links, more particularly to flight conveyer chain links and has for its object to provide a chain link having means for securing a flight or bucket which will not interfere with the disconnection of the chain for repairs, and means for preventing the turning of the securing bolt when renewing a flight or bucket, thereby reducing the time for repairs to a minimum.

This object, and other advantageous ends which will be described hereinafter, I attain in the following manner reference being had to the accompanying drawings in which—

Figure 1:
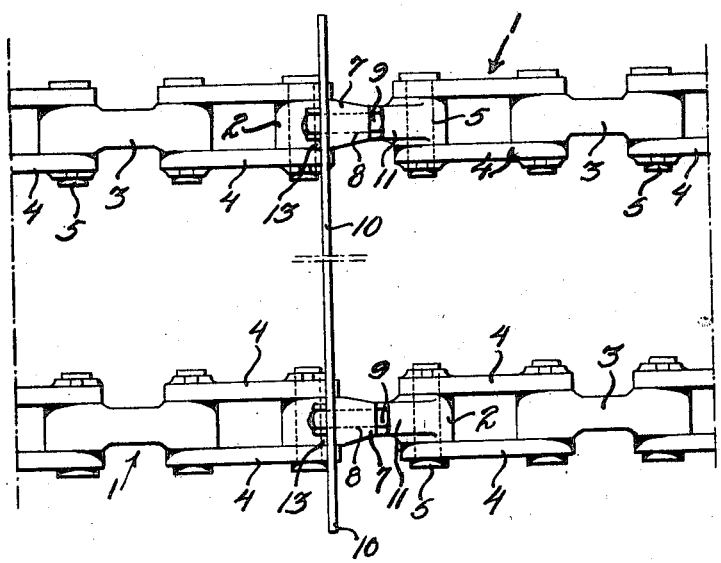
Figure 2:
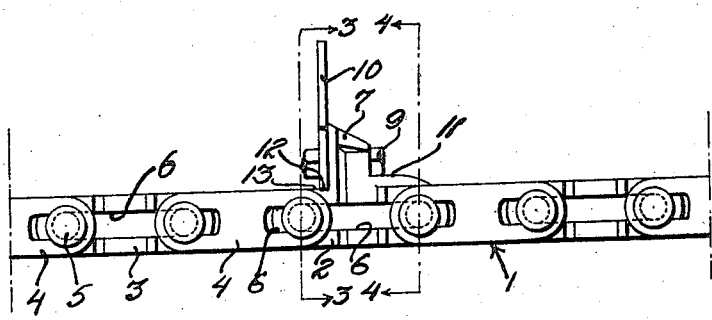
Figure 3:
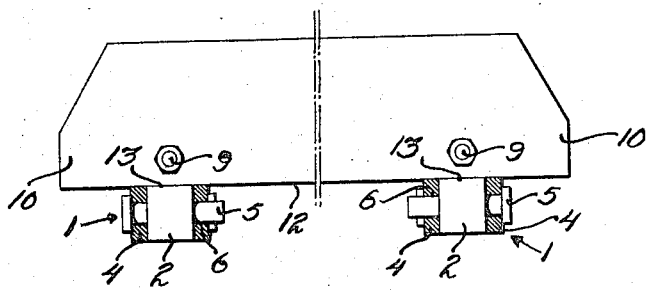
Figure 4:
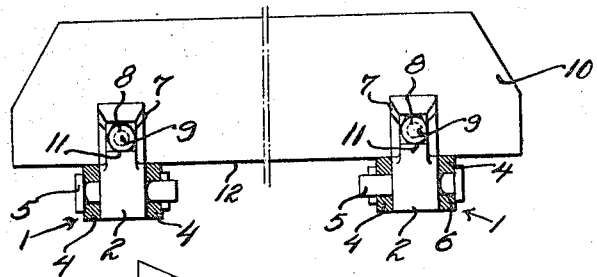
Figure 5:
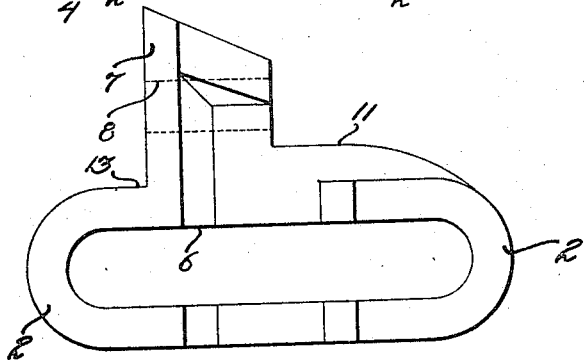
Figure 6:
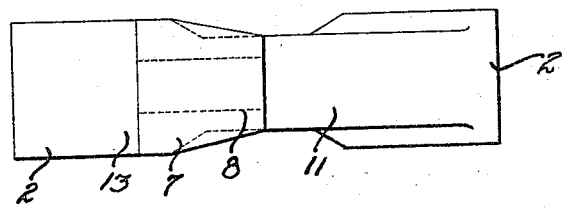

Figure 1 is a plan view of a conveyer chain having my invention applied thereto, Figure 2 a side view of Figure 1, Figure 3 a section on line 3—3 of Figure 2, Figure 4 a section on line 4—4 of Figure 2, Figure 5 a side elevation of a chain link constructed in accordance with my invention, and Figure 6 a plan view of Figure 5.

Referring to the drawings, 1 is a conveyer chain which includes inside links 2 and 3 and outside links 4 connected together by pins 5 passing through slots 6 in the body portion of the links. Inside links 2 are provided with lugs 7 having holes 8 to receive securing bolts 9 adapted to hold a flight 10 to one side of lugs 7. Shoulders 11 on the other side of lugs 7 beneath holes 9, abut the heads of the securing bolts and prevent turning thereof.

When disconnecting the chain for repairs, it is merely necessary to loosen the tension on the chain and withdraw the pins, there being no objectionable flight securing parts in the way. The advantage of having shoulders 11 for preventing the turning of the securing bolts is that when renewing the flight, the securing bolts are usually rusty and consequently difficult to remove due to the turning of the bolts when loosening the nuts. Shoulders 10 prevent turning of the bolts and facilitate renewing of the flight.

While I have shown a double conveyer chain with the links having a flight secured thereto, the links in a single conveyer chain serve equally well for rigidly holding the flight in position by reason of the abutment of the lower edge 12 of the flight against the surface 13 of the body portion of the link.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A conveyer chain link comprising a body portion having a slot; a lug on the body portion; a flight on the lug; securing means in the lug for holding the flight, and means for preventing turning of the securing means.

2. A conveyer chain link comprising a body portion having a slot; a lug on the body portion having a hole; a flight on the lug; a bolt in the hole for holding the flight, and means for preventing the turning of the bolt.

3. A conveyer chain link comprising a body portion having a slot; a lug on the body portion having a hole; a flight on the lug; a bolt in the hole for holding the flight, and a shoulder for preventing the turning of the bolt.

4. A conveyer chain link comprising a body portion having a slot; a lug on the body portion having a hole; a flight on one side of the lug; a bolt passing through the lug adapted to hold the flight, and a shoulder on the other side of the lug for preventing the turning of the bolt.

In testimony whereof I have signed my name to this specification in the presence of two subscribing witnesses.

WILLIAM F. SIPPLE.

Witnesses:
PETER J. WYDORK,
GEORGE E. BOETTNE.